United States Patent [19]
Tobe et al.

[11] Patent Number: 5,821,670
[45] Date of Patent: Oct. 13, 1998

[54] VIBRATION ACUTUATOR

[75] Inventors: Michihiro Tobe; Tadao Takagi, both of Yokohama, Japan

[73] Assignee: Nikon Corporation, Tokyo, Japan

[21] Appl. No.: 774,373

[22] Filed: Dec. 27, 1996

[30] Foreign Application Priority Data

Dec. 28, 1995 [JP] Japan ................................. 7-343025

[51] Int. Cl.$^6$ ............................................... H02N 2/00
[52] U.S. Cl. .......................................... 310/328; 310/323
[58] Field of Search ..................................... 310/323, 328

[56] References Cited

U.S. PATENT DOCUMENTS

| 5,039,899 | 8/1991 | Yamaguchi | 310/323 |
| 5,101,132 | 3/1992 | Yamaguchi | 310/323 |
| 5,136,200 | 8/1992 | Takizawa et al. | 310/323 |
| 5,140,215 | 8/1992 | Yamaguchi | 310/323 |
| 5,191,688 | 3/1993 | Takizawa et al. | 310/323 |
| 5,200,665 | 4/1993 | Iijima | 310/323 |
| 5,256,928 | 10/1993 | Nishikura et al. | 310/323 |
| 5,406,160 | 4/1995 | Shirasaki | 310/323 |
| 5,410,204 | 4/1995 | Imabayashi et al. | 310/323 |
| 5,416,375 | 5/1995 | Funakubo et al. | 310/323 |

FOREIGN PATENT DOCUMENTS

| 7-143771 | 6/1995 | Japan | H02N 2/00 |
| 7-264885 | 10/1995 | Japan | H02N 2/00 |

OTHER PUBLICATIONS

"Ultrasonic Motors", S. Ueha et a., Clarendon Press, Oxford, 1993, pp. 131–135 & 191–196.

"Piezoelectric Linear Motors for Application to Driving a Light Pick–Up Element", Yoshiro Tomikawa et al., Jun. 9–11, 1993, pp. 393–398.

*Primary Examiner*—Thomas M. Dougherty
*Attorney, Agent, or Firm*—Oliff & Berridge, PLC

[57] ABSTRACT

A vibration actuator is provided which is capable of generating a bending vibration having a sufficient amplitude to allow production of a large driving force in a direction perpendicular to the axis of the bending vibration. Specifically, the vibration actuator generates a primary mode longitudinal vibration and a fourth mode bending vibration harmonically in an elastic body, so that a portion of the elastic body having a driving protrusion moves cyclically along an elliptical path. The driving protrusion comes into contact with a relative moving body along a section of the elliptical path, and thus exerts a driving force on the relative moving body. Reduced rigidity portions formed in the elastic body preferably at positions corresponding to antinodes of the bending vibration allow the bending vibration, and therefore also the driving force, to have greater amplitudes.

20 Claims, 9 Drawing Sheets

II-II

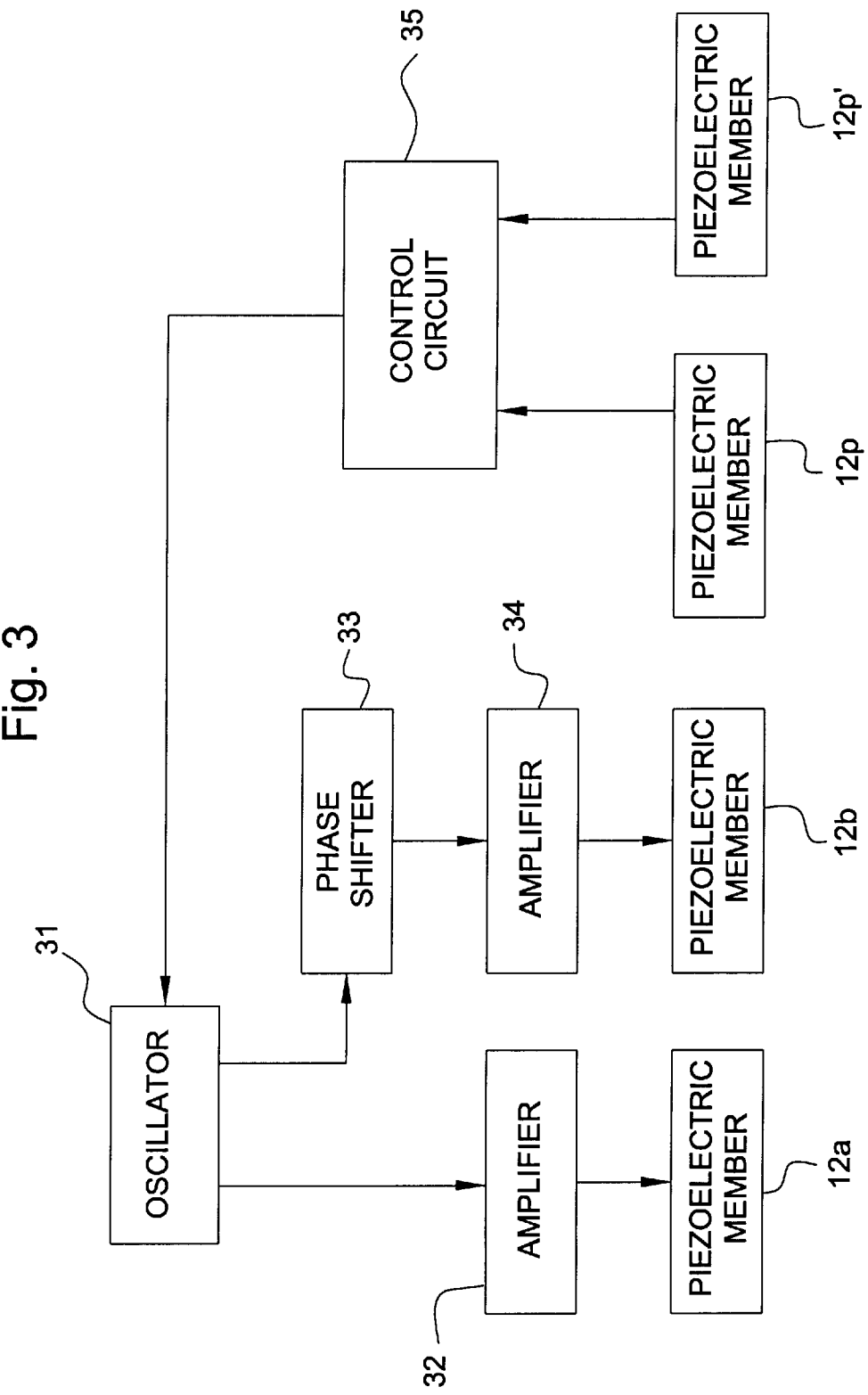

VIBRATION ACUTUATOR

BACKGROUND OF THE INVENTION

1. Field of the Invention

The present invention relates to a vibration actuator for vibrating an elastic body to generate a driving force.

2. Description of Related Art

Vibration actuators that produce a driving force by applying an alternating voltage to an electro-mechanical converting element cemented to an elastic body are known within the art. The electro-mechanical converting element can be a piezoelectric member or electrostriction element (hereinafter referred to as a "piezoelectric member"). A multitude of vibration modes are generated harmonically in the elastic body, thereby causing relative movement between the elastic body and a relative moving element that comes in contact with the elastic body, and causing the elastic body to exert a driving force on the relative moving element. The vibration modes include longitudinal vibrations and bending vibrations.

See, for example, "Piezoelectric Linear Motor Aiming At An Optical Pickup Movement," Tomikawa et al., The Fifth Dynamic Symposium Lecture Papers, pp. 393–398, which discloses a structure and load characteristic of this type of vibration actuator.

"Ultrasonic Motor, New Edition," Ueba and Tomikawa, published by Tricheps, pp. 145–146, discloses the structure of a free-running actuator. This actuator is of a flat-plate type, and is designed so that the resonant frequency of the primary mode longitudinal vibration and the resonant frequency of the fourth mode (or, alternatively, the eighth mode) bending vibration are very close to each other. Two-phase alternating voltages, which have frequencies close to the two resonant frequencies, are applied to the piezoelectric member. This causes a vibration in the elastic body, wherein the two modes (the primary mode and the fourth or eighth mode) harmonize with each other.

The elastic body has a protrusion at a position corresponding to an antinode of the fourth mode bending vibration. A driving force is generated by elliptical movement of the tip of the protrusion.

The resonant frequency of the primary mode longitudinal vibration and the resonant frequency of the fourth mode bending vibration caused in the flat-plate are described by the following mathematical expressions:

Resonant frequency of the primary mode longitudinal vibration:

$$f_{L1} = (\tfrac{1}{2}L) * (E/r)^{1/2} \tag{1}$$

Resonant frequency of the fourth mode bending vibration:

$$f_{B4} = [(\lambda_4 L)^2 t / 2\pi L^2] * (E/12r)^{1/2} \tag{2}$$

Wherein,

E stands for the Young's modulus;
r stands for the density;
L stands for the length of the elastic body;
t stands for the thickness of the elastic body; and
$\lambda_4 L$ is a constant, 14.137166.

The longitudinal-bending type vibration actuator is designed so that the difference between the two resonant frequencies is very small. The ratio of the length L and the thickness t of the elastic body is appropriately selected to result in a very small difference between the two resonant frequencies.

A conventional longitudinal/bending type vibration actuator is shown in FIG. 8.

As shown in FIG. 8, vibration actuator 10 comprises a flat rectangular elastic body 11 having piezoelectric members 12a, 12b, 12p, and 12p' for causing a longitudinal vibration and a bending vibration harmonically in the elastic body 11, and driving protrusions 11a and 11b. The longitudinal vibration occurs along the longitudinal axis 52, and the bending vibration occurs along the bending axis 50. A driving force along the longitudinal axis 52 can be obtained by pressing the vibration actuator 10 onto the relative moving element 20 using a pressing element (not shown), such as a leaf spring, plate spring, coil spring, etc. The vibration actuator 10 may move freely along the relative moving element 20, or the relative moving element 20 may move.

The bending vibration is a vertical component of the elliptical movement generated in the driving protrusions 11a and 11b of the vibration actuator 10, (i.e. it is parallel to the bending axis 50, and is perpendicular to the longitudinal axis 52), and produces a clutch effect. This clutch effect occurs because the bending vibration causes the driving protrusions 11a and 11b to periodically come into contact with the relative moving element 20.

The driving protrusions 11a, 11b are in contact with the relative moving element 20 alternately. If the protrusions 11a, 11b move along the longitudinal axis 52 (due to the longitudinal vibration) while they are in contact with the relative moving element 20, then friction between the protrusions 11a, 11b and the relative moving element 20 allows the protrusions 11a and 11b to exert a driving force on the relative moving element 20, along the longitudinal axis 52.

When the bending vibration and the longitudinal vibration are harmonically generated, i.e. properly synchronized, and when the force exerted by the pressing element on the vibration actuator 10 is appropriate, the protrusions 11a and 11b periodically contact the relative moving element 20 only when the vibration actuator 10 is moving in one direction of the longitudinal vibration (i.e., one direction of the reciprocating movement along the longitudinal axis), thereby effectively exerting a net driving force on the relative moving element 20 in the one direction.

As described above, the conventional longitudinal/bending type vibration actuator 10 uses two types of resonance, longitudinal vibration and bending vibration. The vibration actuator 10 is pressed onto the relative moving element 20 by the pressing element. Since the direction of the force exerted on the vibration actuator 10 by the pressing element is perpendicular to the longitudinal axis 52, the longitudinal vibration is not greatly influenced by the force exerted by the pressing element.

However, the bending vibration of the vibration actuator 10 is greatly affected by the force exerted by the pressing element. As the force exerted on the vibration actuator 10 by the pressing element increases, the amplitude of the bending vibration of the vibration actuator 10 decreases and becomes small.

When the amplitude of the bending vibration becomes small due to the force exerted by the pressing element, the desired clutch effect is reduced. For example, excessive pressing force can cause the driving protrusions 11a, 11b to contact the relative moving element 20 while the vibration actuator 10 is moving in both directions of the longitudinal vibration. Thus, the net driving force exerted by the vibration actuator 10 on the relative moving element 20 in one direction decreases, and the vibration actuator becomes less effective.

As described above, the vibration actuator 10 relies on the principle of friction between the driving protrusions 11a, 11b and the relative moving element 20 to produce a driving force on the relative moving element 20 in a direction along the longitudinal axis 52. Thus, the maximum driving force that the vibration actuator 10 can exert on the relative moving element 20 along the longitudinal axis 52 is proportional to the pressing force, or the force exerted on the vibration actuator 10 to press the driving protrusions 11a, 11b against the relative moving element 20 when the driving protrusions 11a, 11b are in contact with the relative moving element 20.

Accordingly, a large pressing force is necessary to produce a large driving force. In the conventional vibration actuator, this is problematic because a larger pressing force reduces the amplitude of the bending vibration. As described above, a reduced amplitude of the bending vibration reduces the desired clutch effect, and thus reduces the net driving force in one direction along the longitudinal axis.

SUMMARY OF THE INVENTION

An objective of the invention is to provide a vibration actuator that is capable of generating a large bending vibration having a sufficient amplitude to produce a desired driving force, even when a large amount of force is exerted on the vibration actuator in a direction along the axis of the bending vibration.

In order to accomplish this and other objectives, according to one aspect of the invention, a vibration actuator is provided which generates a longitudinal vibration and a bending vibration in an elastic body to cause relative movement between the elastic body and a relative moving element that comes into periodic contact with the elastic member. The elastic body has a portion with a reduced rigidity, in which the rigidity of the elastic body is lowered. This reduced rigidity portion preferably is located at a position corresponding to an antinode of the bending vibration.

The reduced rigidity portion is created for example, by forming a groove on a surface of the elastic body that faces and comes into contact with the relative moving element. The reduced rigidity portion may also be created, for example, by forming a groove on a surface of the elastic body that is opposite to the surface facing the relative moving element. The thickness of the elastic member becomes small at the groove.

The reduced rigidity portion may also be created, for example, by forming a groove on the surface of the elastic member facing the relative moving element, and providing frictional material in the groove so that the elastic body and the relative moving element come into contact via the frictional material.

Alternatively, the reduced rigidity portion may be created, for example, by forming a recess in a side face of the elastic body so that the recess extends into the width of the elastic body, and the effective width and thickness of the elastic body are smaller at the section of the elastic body that includes the recess.

The recess may also be formed in the side face of the elastic body so that it penetrates completely through the width of the elastic body.

The reduced rigidity portion may also be created by forming a notch in the side face of the elastic body so that the width of the elastic body is reduced at the section of the elastic body that includes the notch.

The above structures for forming the reduced rigidity portion are illustrative and are not intended to be limiting. Other structures and/or processes for providing a reduced rigidity portion are within the scope of the invention.

According to a further aspect of the invention, a vibration actuator is provided which generates first and second vibrations in an elastic body to cause a relative movement between the elastic body and a relative moving element and to cause the relative moving element to come into periodic contact with the elastic body. The first vibration oscillates in a plane perpendicular to the contact surface of the elastic body that contacts the relative moving element, and has a non-zero component that oscillates along a line, or axis, perpendicular to the contact surface of the elastic body. The elastic body also has a reduced rigidity portion preferably at a position corresponding to an antinode of the first vibration.

BRIEF DESCRIPTION OF THE DRAWINGS

The invention will be described in detail with reference to the following drawings in which like reference numerals refer to like elements and wherein:

FIGS. 1(A) and 1(B) show a vibration actuator according to a first embodiment of the invention, wherein FIG. 1(A) is a perspective view of the vibration actuator, and FIG. 1(B) shows the relationship between the waveform (shape of the mode) of the bending vibration and the positions of the grooves corresponding to the reduced rigidity portions of the vibration actuator;

FIG. 3 is a block diagram of a driving circuit for driving the vibration actuator of the first embodiment;

FIGS. 6(A)–(C) show a vibration actuator according to a second embodiment of the invention, in which FIG. 6(A) is a perspective view showing a vibration actuator having recesses in its width, FIG. 6(B) shows a relationship between the waveform (shape of the mode) of the bending vibration and positions of the recesses in the width of the vibration actuator and FIG. 6(C) shows a variation of the vibration actuator in which the recesses penetrate completely through the width of the vibration actuator;

FIGS. 7(A) and 7(B) show a vibration actuator according to a third embodiment of the invention, wherein FIG. 7(A) is a perspective view of the vibration actuator and FIG. 7(B) shows a relationship between a waveform (shape of the mode) of the bending vibration and positions of notches in the width of the vibration actuator.

DETAILED DESCRIPTION OF PREFERRED EMBODIMENTS

Figure 1A:
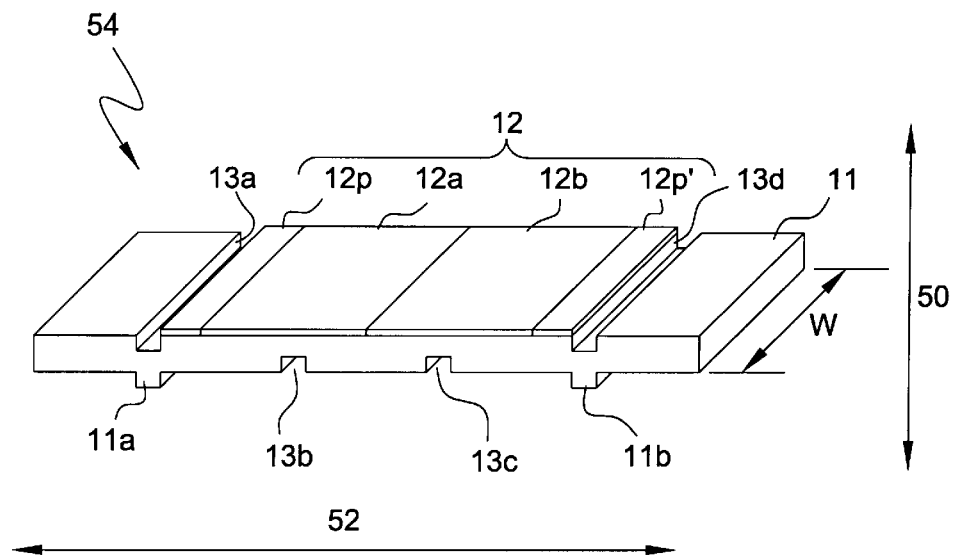
Figure 1B:
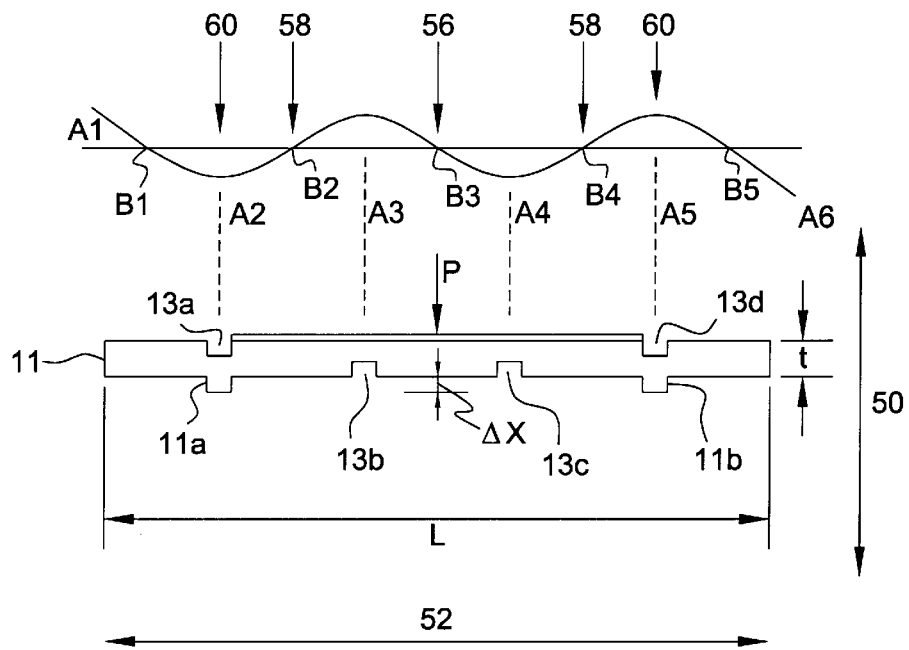

FIGS. 1(A) and 1(B) show a vibration actuator according to the first embodiment of the invention. FIG. 1(A) is a perspective view of the vibration actuator and FIG. 1(B) shows the relationship between the waveform of the bending vibration and positions of the reduced rigidity portions.

The vibration actuator 54 of the first embodiment is an ultrasonic actuator comprising an elastic body 11, and a piezoelectric body 12 formed from four piezoelectric members 12a, 12b, 12p and 12p' cemented onto the elastic body 11. The ultrasonic actuator generates the primary mode longitudinal vibration and the fourth mode bending vibration harmonically, and the interaction of the longitudinal and bending vibrations allows the actuator to produce a driving force.

The elastic body 11 is a rectangular flat-plate made of metal, resin, or any other suitable substance. The elastic body 11 has, as shown in FIG. 1(B), antinodes A1–A6 and nodes B1–B5. Driving protrusions 11a, 11b are formed on the bottom surface of the elastic body 11 at positions A2 and A5 corresponding to antinodes of the bending vibration. The driving protrusions are formed monolithically with the elastic body 11. Alternatively, the driving protrusions can be made separately of a material having a sufficient coefficient of friction and bonded to the elastic body 11.

Piezoelectric members 12a and 12b are the driving piezoelectric members which vibrate the elastic body 11 by the piezoelectric effect. Piezoelectric members 12p and 12p' are connected to the control circuit 35, as shown in FIG. 3 and described further below, and are used for monitoring the state of the vibrations caused in the elastic body 11. The main body of the elastic body 11 is electrically grounded, i.e. connected to a ground (GND) potential.

In the first embodiment, four grooves 13a, 13b, 13c and 13d are formed in the elastic body 11 along the width W of the elastic body (i.e., perpendicular to the longitudinal axis of the elastic body 11). The grooves 13a–13d reduce the thickness of the elastic body 11 and cause the sections of the elastic body 11 containing the grooves to function as reduced rigidity portions of the ultrasonic actuator, thereby enlarging the amplitude of the bending vibration. The grooves 13a–13d are formed at positions corresponding to antinodes (A2, A3, A4 and A5) of the bending vibration, as shown in FIG. 1(B).

In the case where a force P is applied at a pressing position 56, and the elastic body 11 is characterized by a length L, a width W, and a thickness t, an amount Δx by which the elastic body 11 will bend or deflect can be expressed as follows:

$$\Delta x = PL^3/4EWt^3 \tag{3}$$

This expression shows that the bending amount Δx is inversely proportional to the width W of the elastic body 11, and is inversely proportional to the cube of thickness t. Thus, it can be seen that reducing the thickness of the elastic body 11 is an efficient way to increase the distance by which the elastic body 11 will deflect when subjected to a given force, i.e. to increase the flexibility of the elastic body 11.

As shown in the side view of the elastic body 11 in FIG. 1(B), the grooves 13a–13d are formed so that they are symmetrical with regard to a center line bisecting the length of the elastic body 11. This arrangement reduces any difference in performance in the driving direction, i.e. in a direction along the longitudinal axis 52.

Figure 2A:
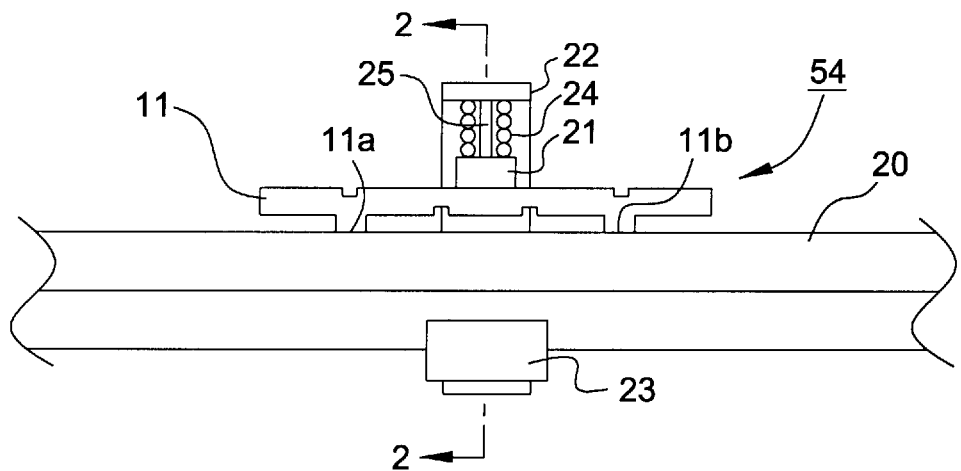
FIG. 2(A) shows an example of a vibration actuator according to the first embodiment applied to a free-running type of moving device.
Figure 2B:
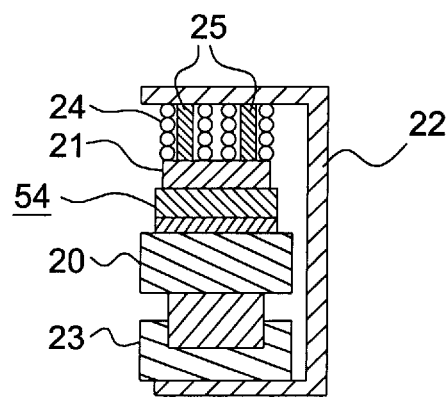
FIG. 2(B) shows a sectional view of the vibration actuator along line 2—2 shown in FIG. 2(A)

FIGS. 2(A) and 2(B) show an example in which the vibration actuator of the first embodiment is incorporated into a free-running type of moving device.

As shown in FIGS. 2(A) and 2(B), the protrusions 11a, 11b of vibration actuator 54 make periodic contact with the relative moving element 20. Friction between the protrusions 11a, 11b and the relative moving element 20 allows the vibration actuator to exert a driving force on the relative moving element 20.

Pressing retainer 21 presses and retains the elastic body 11 onto the relative moving element 20, such as a rail, through a force generating element 24 (e.g., a coil spring). The pressing retainer 21 is fixed to a housing 22 by a pressure adjuster screw 25. The housing 22 is firmly attached to the linear guide 23 provided on, and positioned under, the bottom face of the relative moving element 20.

In this structure, the orientation of the elastic body 11 of the vibration actuator 54 can be maintained, and the direction in which the elastic body 11 exerts force on the relative moving element 20 is maintained by the linear guide 23.

The force generating element 24 may be, for example, a leaf spring or a plate spring. The relative moving element 20 can be, for example, a rail or a roller.

FIG. 3 is a block diagram of a driving circuit for driving the vibration actuator of the first embodiment.

As shown in FIG. 3, oscillator 31 generates an oscillating voltage signal, and its output is split between a first amplifier 32 and the phase shifter 33. The first amplifier 32 amplifies the signal from the oscillator 31 and provides the amplified signal to the piezoelectric member 12a of the vibration actuator 54. The phase shifter 33 time-shifts the signal from the oscillator 31 by $\pi/2$ radians, and provides the time-shifted signal to a second amplifier 34. The second amplifier 34 amplifies the time-shifted signal, and provides the amplified, time-shifted signal to the piezoelectric member 12b.

The control circuit 35 detects the vibrational status of the vibration actuator 54 via the piezoelectric members 12p and 12p'. Based on the detected vibrational status, the control circuit 35 feeds a control signal to the oscillator 31. In response, the oscillator 31 generates an oscillating voltage signal such that the desired vibration modes harmonically occur in the elastic body 11.

By applying alternating voltages having a relative phase difference of $\pi/2$ radians to piezoelectric members 12p and 12p', respectively, the tips of the driving protrusions 11a and 11b of the elastic body 11 are caused to move in an elliptical pattern. Driving force is applied to the relative moving element 20 by pressing the driving protrusions 11a, 11b of the elastic body 11 onto the relative moving element 20.

Thus, in contrast with a conventional vibration actuator, the vibration actuator according to the first embodiment can generate a bending vibration with a large amplitude. Accordingly, greater force can be applied to the elastic body 11 in a direction parallel to the movement of the bending vibration, without excessively reducing the amplitude of the bending vibration and thus the clutch effect.

As a result, the force pressing the elastic body 11 and the relative moving element 20 together when the elastic body 11 is in periodic contact with the relative moving element 20 can be greater than that exerted when using a conventional vibration actuator. Consequently, the vibration actuator according to preferred embodiments of the present invention can apply a larger driving force to the relative moving element 20 in a direction parallel to the movement of the longitudinal vibration.

FIGS. 4(A)–(D) show variations of the elastic body 11 of the vibration actuator 54 of the first embodiment, wherein the grooves 13a, 13b, 13c, 13d, 13b' and 13c' are located in different positions.

Figure 4A:
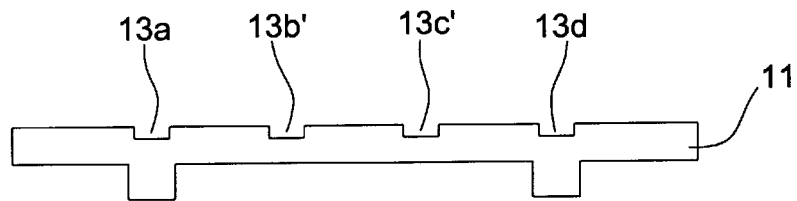
FIGS. 4(A)–(D) show variations of vibration actuators according to the first embodiment, with grooves in different positions.
Figure 4B:
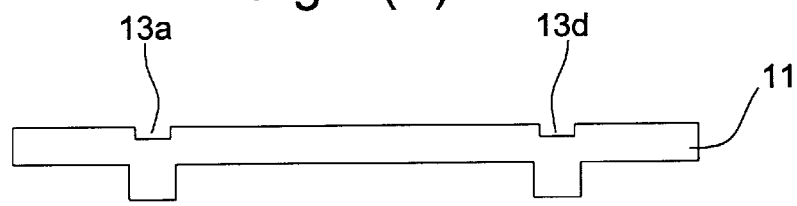
Figure 4C:
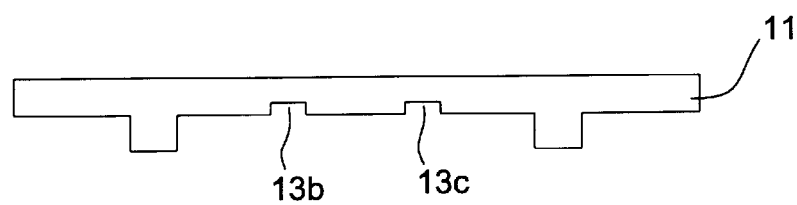
Figure 4D:
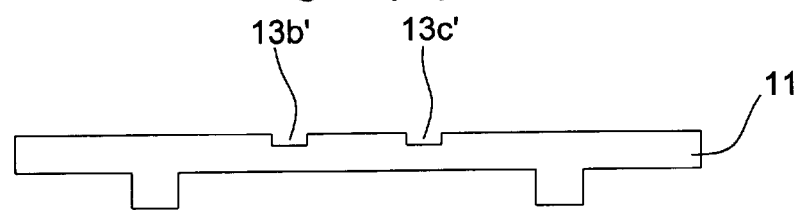

In the vibration actuator 54 shown in FIGS. 1(A) and 1(B), grooves 13a and 13d are formed on the top surface of the elastic body 11, and grooves 13b and 13c are formed on the bottom surface of the elastic body 11. However, all of the grooves can be formed on the top surface, as shown for example in FIG. 4(A), where grooves 13b' and 13c' are formed between the outer grooves 13a and 13d. Alternatively, a fewer number of grooves can be formed only on the top surface of the elastic body 11, as shown in FIGS. 4(B) and 4(D), or a fewer number of grooves may be formed only on the bottom surface of the elastic body 11, as shown in FIG. 4(C). In addition, the grooves can be formed close together as shown in FIGS. 4(A), 4(C) and 4(D), or further apart as shown in FIG. 4(B). These variations can be variously selected depending on the desired effect.

The device shown in FIGS. 2(A) and 2(B) has a pressing position corresponding to position 56 of the node B3 of the bending vibration shown in FIG. 1(B). Alternatively, the pressing position can correspond to the positions 58 of the nodes B2 and B4 of the bending vibration, or to the positions 60 of the antinodes A2 and A5 of the bending vibration. If the elastic bodies shown in FIG. 4(C) or 4(D) are used, the pressing position is preferably at position 56 or at both positions 60.

FIGS. 5(A)–(D) show various groove shapes that may be used for the grooves in the elastic body. In FIGS. 1(A) and 1(B), the grooves 13a–13d of the vibration actuator 54 are formed with a rectangular cross-section. However, the cross-section of the grooves may be triangular, as in groove 13-1 of FIG. 5(A), or semicircular, as in groove 13-2 of FIG. 5(B).

Figure 5A:
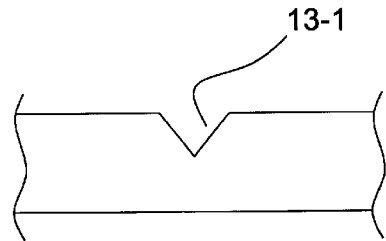
FIGS. 5(A)–(D) show vibration actuators according to the first embodiment, with grooves having different shapes.
Figure 5B:
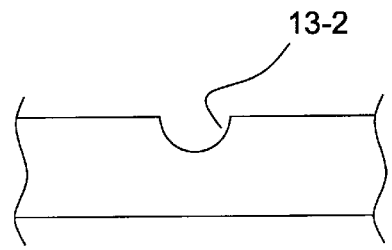
Figure 5C:
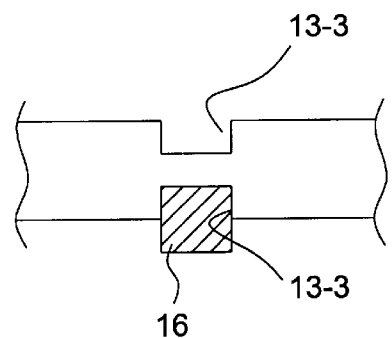
Figure 5D:
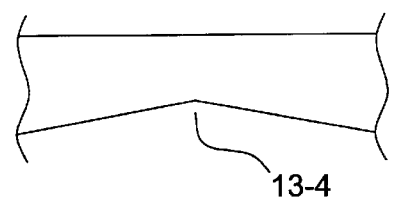

Alternatively, grooves 13-3 may be formed on both the top and bottom surfaces of the elastic body 11 at the same position, as shown in FIG. 5(C). In that case, a material 16 having a sufficiently high coefficient of friction preferably is attached to the bottom groove, and is used as a driving protrusion. Furthermore, as shown in FIG. 5(D), the groove may be an indentation 13-4 having a gentle slope.

Figure 6A:
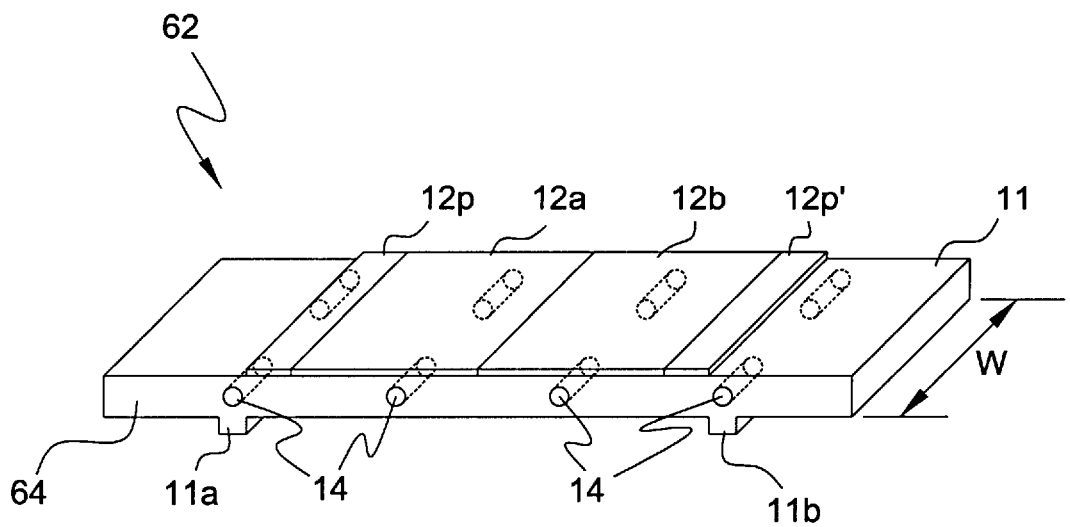
Figure 6B:
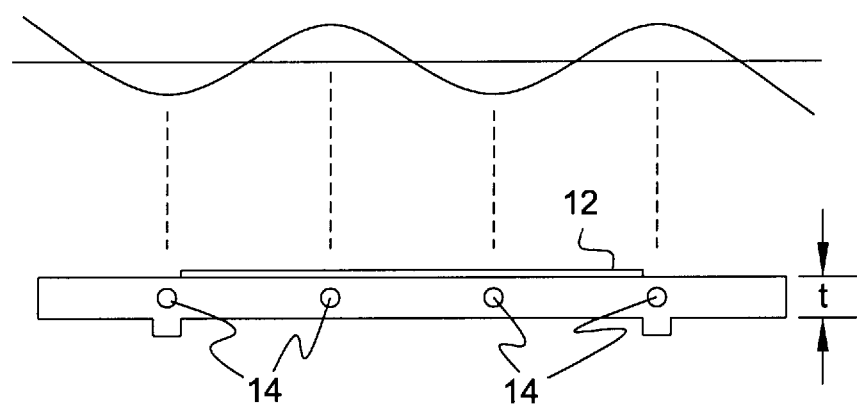
Figure 6C:
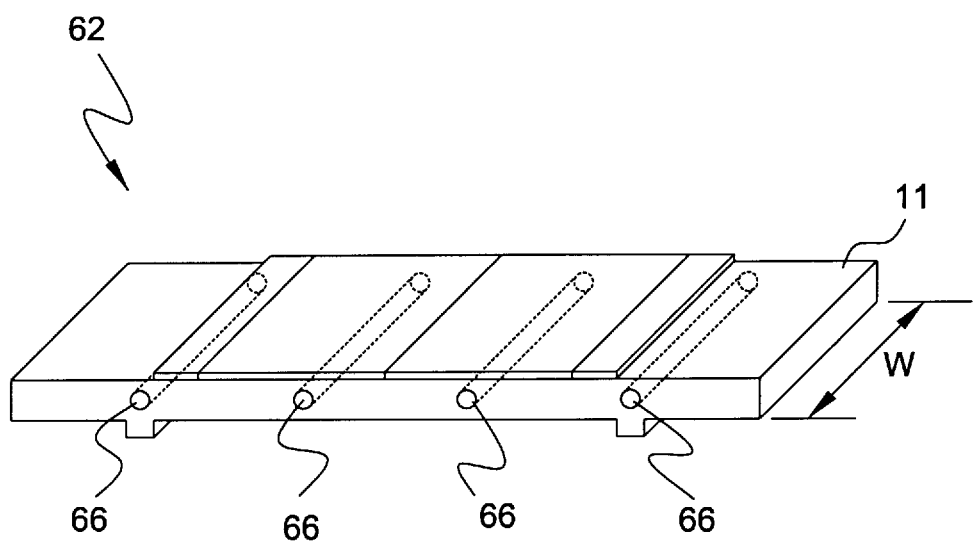

FIGS. 6(A)–(C) show a vibration actuator 62 according to a second embodiment.

In the second embodiment, recesses 14 are formed in the side face 64 of the elastic body 11. These recesses 14 reduce the effective thickness and width of the elastic body 11. The effective reduction in thickness and width increases the flexibility of the elastic body 11, as demonstrated for example by the mathematical expression (3) described further above. This increase in flexibility of the elastic body 11 causes a corresponding increase in the amplitude of the bending vibration. In other words, the recesses 14 formed in the side face of the elastic body 11 reduce the rigidity of the elastic body 11 in the section that includes those recesses, and thereby increase the amplitude of the bending vibration. The increase in amplitude caused by the recesses 14 is largest when the recesses 14 are formed in the elastic body 11 at positions corresponding to antinodes of the bending vibration, as shown for example in FIG. 6(B).

A further advantage of the vibration actuator 62 according to the second embodiment is that it is easily manufactured because the recesses 14 are simply and easily formed in the elastic body 11.

FIG. 6(A) shows the recesses 14 formed in opposite side faces of the elastic body 11, and the recesses 14 do not penetrate entirely through the elastic body 11. However, recesses 66 can be formed penetrating completely through the elastic body 11 between the side faces of the elastic body 11, as shown in FIG. 6(C). These recesses 66 likewise increase the flexibility of the elastic body 11, thereby producing the beneficial effect of increased amplitude of the bending vibration. FIG. 6(C) shows four recesses 66, but different numbers of recesses 66 can be appropriately selected depending on the desired flexibility of the elastic body 11.

Figure 7A:
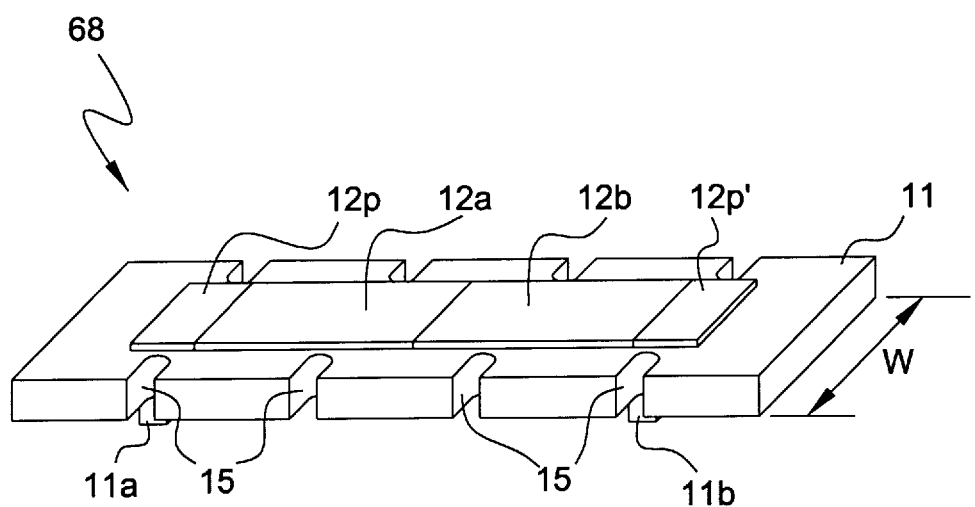
Figure 7B:
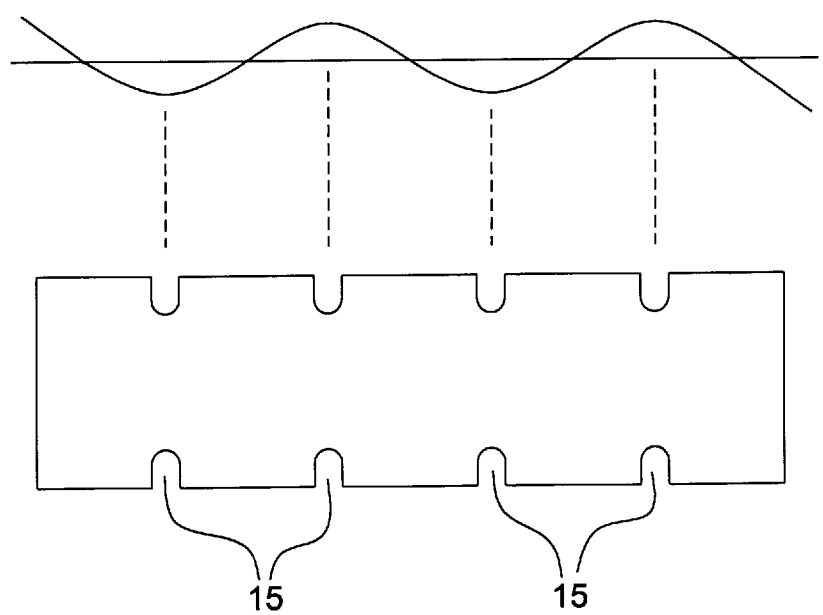
Figure 8:
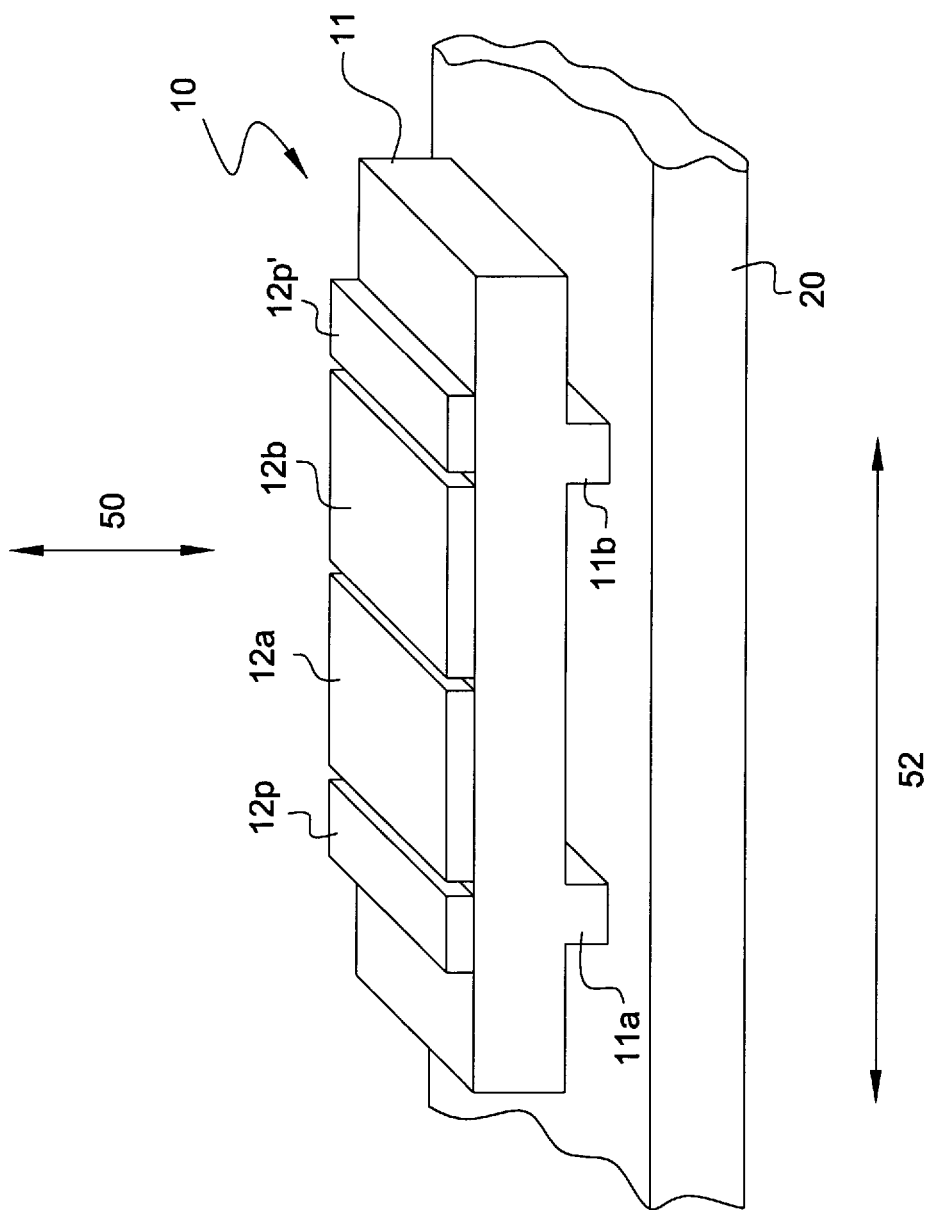
FIG. 8 illustrates a conventional longitudinal/bending type of vibration actuator.

FIGS. 7(A) and 7(B) show a vibration actuator 68 according to a third embodiment of the invention.

In the third embodiment, notches 15 are formed in the side faces of the elastic body 11. The width of the elastic body 11 becomes narrower at the sections that include the notches 15, thereby enlarging the amplitude of the bending vibration. In other words, by forming notches 15 in the side faces of the elastic body 11, the rigidity of the elastic body 11 is reduced at these sections, thereby enlarging the amplitude of the bending vibration.

The vibration actuator 68 of the third embodiment is easily manufactured, because the notches 15 are simply and easily formed in the side faces of the elastic body 11. As demonstrated by the mathematical expression (3) described further above, as the width of the elastic body 11 becomes narrower, the flexibility of the elastic body 11 increases. As the flexibility of the elastic body 11 increases, the amplitude of the bending vibration increases, and thus the desired effect of increasing the amplitude of the bending vibration is achieved.

The effect of increasing the amplitude of the bending vibration is greatest when the notches 15 are formed in the positions corresponding to the antinodes of the bending vibration, as shown in FIG. 7(B). The number of notches 15 can be appropriately selected depending on the desired effect. For example, four pairs of notches 15 can be formed as shown in FIG. 7(B), or two pairs notches can be formed.

In the embodiments described above, the vibration actuator uses the primary mode longitudinal vibration and the fourth mode bending vibration. This can be generalized to a vibration actuator that uses a longitudinal vibration of the nth degree and a bending vibration of the mth degree. The technique described above can also be successfully applied to the vibration actuator that uses a longitudinal vibration of the nth degree and a bending vibration of the mth degree, to enlarge the amplitude of the bending vibration. Those skilled in the art will also recognize that the frequency of the longitudinal vibration can be an integer multiple of the frequency of the bending vibration, or substantially equal to an integer multiple of the frequency of the bending vibration.

Pressing positions for the second and third embodiments, for pressing the vibration actuator toward the relative moving body 20, can be located at positions corresponding to nodes or antinodes of the bending vibration, as described further above with respect to the first embodiment.

The recesses 14 and the notches 15 can also be formed having shapes different from those shown in FIGS. 6(A)–6(C), 7(A) and 7(B), for example rectangular shapes, triangular shapes, and other polygonal and/or curved shapes.

In all of the embodiments the reduced rigidity portions of the vibration transducer, e.g., the grooves 13 of the first embodiment, the recesses 14 of the second embodiment, and the notches 15 of the third embodiment, can alternatively be located at positions that do not correspond to the antinodes of the bending vibration.

The embodiments described above use piezoelectric bodies to generate the vibrations in the elastic member. The vibrations can also be generated using other techniques and apparatuses that do not require piezoelectric bodies.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A vibration actuator for use with a relative moving element and which causes relative movement between the vibration actuator and the relative moving element, the vibration actuator comprising:

an elastic body in which a bending vibration and a longitudinal vibration are induced to cause the relative movement between the elastic body and the relative moving element, the elastic body including at least one reduced rigidity portion that is less rigid than a majority of the elastic body and is positioned in a manner to correspond to an antinode of the bending vibration in the elastic body.

2. A vibration actuator according to claim 1, wherein the at least one reduced rigidity portion comprises at least one groove formed in one of a first surface of the elastic body opposite to the relative moving element, and a second surface of the elastic body opposite to the first surface, so that the groove reduces a thickness of the elastic body.

3. A vibration actuator according to claim 2, wherein the at least one groove has a cross sectional shape comprising at least one of a polygonal shape and a curved shape.

4. A vibration actuator according to claim 1, wherein the at least one reduced rigidity portion comprises at least one groove formed on a surface of the elastic body opposite to the relative moving element, and further comprising frictional material provided in the at least one groove.

5. A vibration actuator according to claim 1, wherein the at least one reduced rigidity portion comprises at least one recess formed in a side face of the elastic body, the at least one recess extending into a width of the elastic body so that the at least one recess reduces an effective thickness and width of the elastic body at the at least one reduced rigidity portion.

6. A vibration actuator according to claim 5, wherein the at least one recess penetrates completely through the width of the elastic body.

7. A vibration actuator according to claim 1, wherein the at least one reduced rigidity portion comprises at least one notch formed in a side face of the elastic body so that the at least one notch reduces a width of the elastic body at the at least one reduced rigidity portion.

8. A vibration actuator according to claim 4, wherein said frictional material is inserted in said groove in a state such that a portion thereof protrudes, and said protruded portion contacts said relative moving element as a driving force output portion.

9. A vibration actuator according to claim 1, further comprising a biasing device that applies a force between the vibration actuator and the relative moving element.

10. A vibration actuator according to claim 1, wherein a plurality of the reduced rigidity portions are provided in the elastic body.

11. A vibration actuator according to claim 10, wherein the plurality of reduced rigidity portions are provided at respective antinodes of the bending vibration in the elastic body.

12. A vibration actuator according to claim 10, wherein the elastic body includes two of the reduced rigidity portions.

13. A vibration actuator according to claim 10, wherein the elastic body includes four of the reduced rigidity portions.

14. A vibration actuator according to claim 10, further comprising at least one driving protrusion on the elastic body, one of the reduced rigidity portions being provided at a location corresponding to a location of the at least one driving protrusion.

15. A vibration actuator according to claim 10, further comprising at least one driving protrusion on the elastic body, the at least one driving protrusion being spaced from the plurality of reduced rigidity portions.

16. A vibration actuator, comprising:

an elastic body having rigidity reducing means for reducing a rigidity of portions of the elastic body, and a surface adapted for periodically contacting a relative moving element so that the vibration actuator and the relative moving element move relative to each other when a bending vibration and a longitudinal vibration are induced in the elastic body, the rigidity reducing means reducing the rigidity of portions of the elastic body at positions corresponding to respective antinodes of the bending vibration in the elastic body.

17. A vibration actuator for use with a relative moving element and which causes relative movement between the vibration actuator and the relative moving element by periodically contacting the relative moving element, the vibration actuator comprising:

an elastic body in which first and second oscillations are induced, the first oscillation being in a plane that intersects a surface of the relative moving element that is periodically contacted by the vibration actuator, the elastic body including reduced rigidity portions in which the rigidity of the elastic body is reduced relative to other portions of the elastic body, the reduced rigidity portions being located on the elastic body at respective antinodes of the first oscillation in the elastic body.

18. A vibration actuator comprising:

an elastic body having at least one driving protrusion for use in contacting a relative moving element to move the elastic body and the relative moving element relative to each other;

a piezoelectric body attached to the elastic body for inducing a bending vibration and a longitudinal vibration in the elastic body to move the elastic body and the relative moving element relative to each other;

the elastic body including reduced rigidity portions that have a flexibility that is greater than a flexibility of a majority of the elastic body and are located at positions corresponding to respective antinodes of the bending vibration in the elastic body.

19. A vibration actuator according to claim 18, wherein the reduced rigidity portions are grooves formed in at least one surface of the elastic body.

20. A vibration actuator according to claim 18, wherein the reduced rigidity portions are portions of the elastic body that have a cross sectional area that is less than a cross sectional area of the majority of the elastic body.

* * * * *